UNITED STATES PATENT OFFICE.

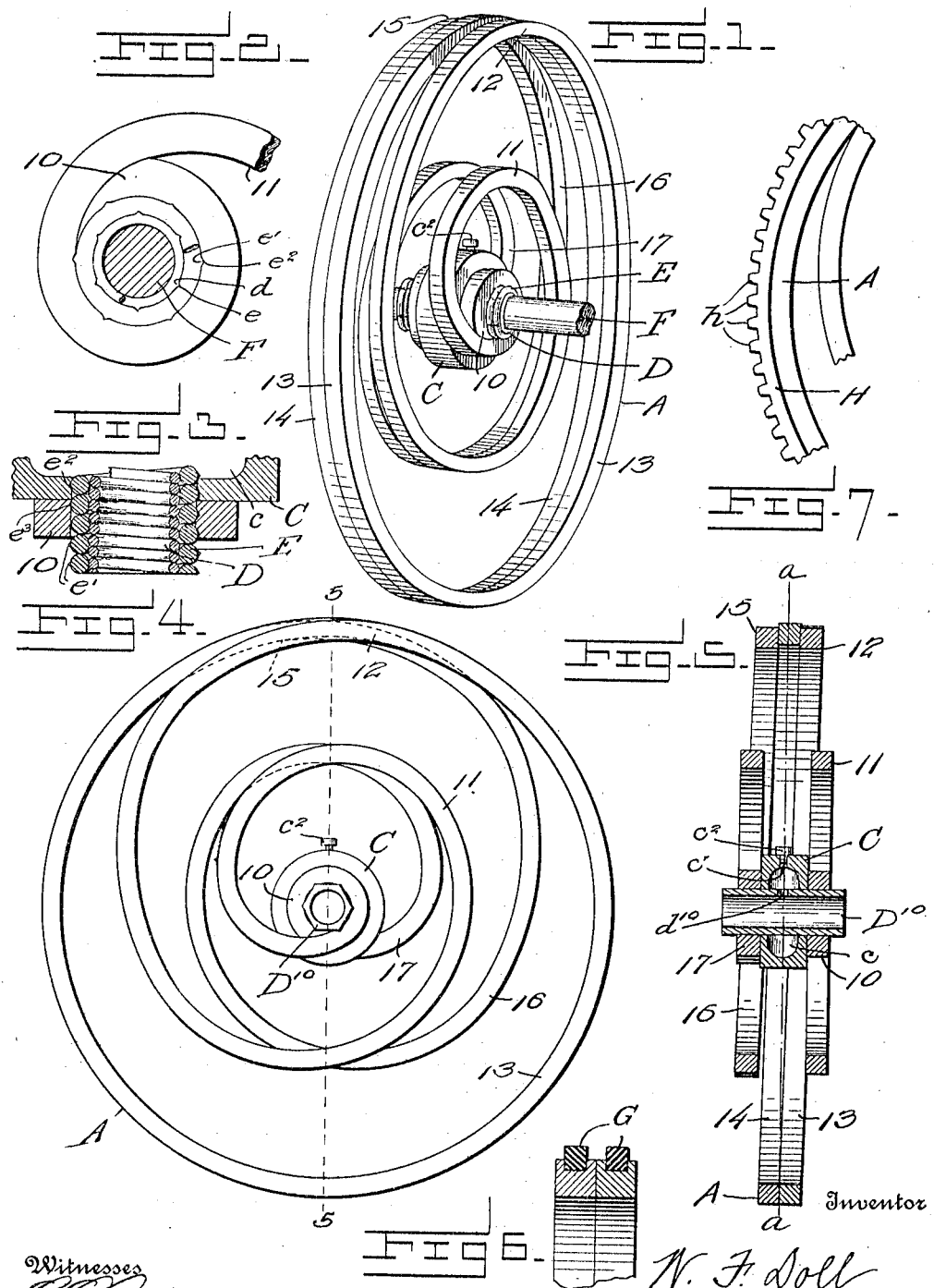

WILLIAM F. DOLL, OF LIBERTY, NEW YORK.

RESILIENT WHEEL.

1,048,813.

Specification of Letters Patent. Patented Dec. 31, 1912.

Application filed January 18, 1912. Serial No. 671,846.

*To all whom it may concern:*

Be it known that I, WILLIAM F. DOLL, a citizen of the United States, residing at Liberty, in the county of Sullivan and State of New York, have invented new and useful Improvements in Resilient Wheels, of which the following is a specification.

This invention relates to spring wheels, including vehicle wheels, gear wheels, pulleys and the like and especially to that hitherto proposed style of wheels whose body is composed of spring metal bent from the hub to form the periphery of the wheel.

The particular purpose of the present invention is to provide a wheel of this style which will thoroughly satisfy the requirements of a practicable wheel, in respect of strength, durability and resilience in all directions.
In accordance with this purpose the present invention consists of a resilient wheel comprising oppositely disposed spirals whose convolutions extend from the hub to the rim of the wheel and around in the form of a circle at the rim or tread, the convolutions of the circular portion at said tread lying closely together, side by side.

The invention also consists of a spring wheel of the style hereinbefore mentioned having a hub comprising a helically coiled member.

The invention also consists of other novel features as will hereinafter fully appear.

In the accompanying drawings I have shown the best embodiment of my invention now known to me, but I would have it understood that the invention may be embodied in other specifically different forms without departing from its spirit or the scope of the subjoined claims.

In said drawings:—Figure 1 is a perspective view of the preferred form of the present invention. Fig. 2 is a detail representation, particularly intended to show the preferred form of resilient hub. Fig. 3 is a sectional detail representation of a part of the length of said resilient hub, the end of the body spring coiled around the same, and a part of the spacer. Fig. 4 is a side view of a wheel or pulley having a different hub from that shown in the preceding figures. Fig. 5 is a section on the line 5—5 of Fig. 4. Fig. 6 is a sectional representation of a part of the tread of the wheel, showing the same provided with a tire. Fig. 7 is a side view of a part of the rim, provided with gear teeth.

Similar characters of reference denote corresponding parts in the several views.

In all of the herein exemplified forms of the present invention, the body of the wheel is composed of a continuous piece of spring metal coiled as follows: Starting at the hub hereinafter described, and at either end of the metal forming the body and rim of the wheel, (the end 10, for example) the metal, leaving the end of the hub, around which it is preferably coiled, as shown, extends spirally, as shown at 11, from said hub toward the rim and in a direction which causes it gradually to approach a vertical plane which intersects the hub at a point midway between the ends of the latter, (said plane being indicated by the dotted line *a—a* in Fig. 5). At the place marked 12 in Fig. 1, the metal is bent to form convolutions 13 and 14 which are of circular form and lie close together side by side, and from the point 15 the bending is such as to form a spiral 16 extending toward the hub, its end 17 terminating at the end of the latter remote from the end 10 and being preferably coiled around the same as shown.

It will be apparent that a wheel thus formed is composed of two oppositely disposed spirals whose convolutions are such that a rim A is formed in part of a central circular member and in part of two approximately circular members which respectively lie on opposite sides and close to the edges of the central circular member and terminate in spirals which are coiled in relatively reverse directions between the rim and the hub or axis of the wheel. The coils of the latter portions, except as to their reverse positions, are, substantially, duplicates of each other, and one commences to recede from the line of the surface of the intermediate convolutions at a place adjacent to that at which the other reaches such line, as clearly indicated in Fig. 4. Their relative disposition therefore, is such that the rim presents two closely arranged side by side convolutions at all places around the same except at the single point indicated at the top of Fig. 5, where the central convolution protrudes slightly beyond the surfaces of the other convolutions, but this is unimportant, its extent being so slight that it is not perceptible and its effect being compensated for by the relative disposition of the outside convolutions at this place.

It will be apparent that a wheel whose body and rim is thus formed has the cup shape which is essential or highly desirable in a wheel of this kind, and moreover is resilient in both vertical and horizontal planes and presents a tread of highly satisfactory and practicable nature.

The coils of the ends of the metal piece closely embrace the hub and between their confronting surfaces there is arranged a spacing block C which is preferably formed with an internal chamber $c$ adapted to serve as a container for a suitable lubricant. Any suitable means are provided through which the chamber $c$ may be supplied with lubricant, the means herein indicated comprising a filling aperture $c'$ in the spacing block, having a screw plug $c^2$ for closing it.

Two different forms of hubs are shown. The one preferred is of a flexible nature. Preferably it comprises two coiled members D and E respectively, mounted one within the other. The inner member D receives the axle spindle or shaft F and forms the hub box or a bushing. It is of soft metal, whereby wear of the shaft or axle spindle is reduced to a minimum. The outer member, E, is of harder metal. This provides a very desirable construction of flexible hub being capable of yielding to vertical strains tending to bend the axle spindle or shaft and at the same time causing no appreciable wear of the shaft or axle spindle. It also will permit oil from the chamber $c$ to flow to the shaft or axle spindle F at a number of different places in the length of the latter, through the spaces between the coils of the members D and E. If means are necessary to prevent longitudinal movement of the coils one on the other, such means are preferably provided by forming the coils respectively with protrusions $d$ and recesses $e$, the protrusions of one being received by the recesses of the other. The outer coil is also preferably formed with protrusions $e'$ which are received by recesses $e^2$ and $e^3$ formed in the spacing block and body coils 10, respectively, to prevent movement of the latter on the hub.

The hub $D^{10}$ shown in Figs. 4 and 5, is composed of a sleeve whose outer surface is polygonal to tend to hold it against longitudinal displacement. The hub herein shown is hexagonal in cross section. It has an aperture $d^{10}$ through which its interior has communication with the lubricant chamber $c$, the lubricant thereby reaching the shaft or axle spindle F which passes through said hub.

If desired, the outer convolutions of the body of the wheel may be provided with solid rubber or other suitable tires, as shown at G, in Fig. 6; and for some purposes said outer convolutions may be provided with a supplemental rim H having gear teeth $h$, as shown in Fig. 7.

The coiled body member of the wheel is preferably formed of a strip of spring steel which is angular in cross section, this form while not essential being best adapted to the purposes of the present invention.

While only one spiral convolution is shown between the hub and the rim, at each side of the wheel, it will be apparent that in practice there may be any number of such convolutions.

It will be noted that the wheel herein illustrated and described comprises a spring which is coiled to provide a rim or felly having two or more convolutions at approximately all points thereof, the spring extending from said rim or felly in the form of oppositely disposed and divergently arranged spirals to a hub which has a spirally coiled body and is provided with a lubricant receptacle which is open to the hub, the lubricant receptacle being arranged between the ends of the spring and holding the latter in a spaced relation such as to maintain the desired dished or cupped form of the wheel due to the described divergence of the spirally-coiled portions between the rim and the hub, such form giving added strength to the wheel, and the spirally coiled body of the hub providing convolutions through which lubricant may pass from said receptacle to a shaft mounted in said hub.

Having now described the invention what I believe to be new and desire to secure by Letters Patent, is:—

1. A resilient wheel having its body formed of oppositely disposed spirals whose convolutions extend from the axis of the wheel to the rim thereof, and thence around in the circular form, there being a plurality of convolutions at all points in the circumference, the said convolutions of the circular portions lying closely together, side by side, and forming said rim.

2. A resilient wheel having its body formed of oppositely disposed spirals whose convolutions extend from the axis of the wheel to the rim thereof, and thence around in circular form, there being a plurality of convolutions at all points in the circumference, said convolutions of the circular portions lying closely together, side by side, and forming said rim, and said oppositely disposed spirals being inclined toward said rim, the ends of the spirals adjacent to the axis of the wheel being spaced from each other, and means arranged between said ends for maintaining their said spaced relation.

3. A resilient wheel, comprising a hub and a body, the hub having a spirally coiled member adapted to receive a shaft and to permit lubricant to pass through its convolutions to said shaft, and said body being formed of oppositely disposed spirals whose ends embrace opposite ends of the hub and are spaced apart on the latter, the convolutions of the spirals extending from said hub to the rim of the wheel and thence around in circular form, there being a plurality of convolutions at all points of the circumference, said convolutions of the circular portions lying closely together, side by side, and forming said rim.

4. A resilient wheel, comprising a flexible hub and a body, said body being formed of oppositely disposed spirals whose ends closely embrace opposite ends of the hub and are spaced apart on the latter, the convolutions of the spirals extending from said hub to the rim of the wheel and thence around in circular form, the convolutions of the circular portions lying closely together side by side, and forming said rim; and said flexible hub being formed of a plurality of coiled members, the inner member of which is of soft metal and is adapted to receive an axle spindle or shaft.

5. A resilient wheel, comprising a hub, a body formed of oppositely disposed spirals whose ends closely embrace opposite ends of the hub and are spaced apart on the latter, the convolutions of the spirals extending from said hub to the rim of the wheel and thence around in circular form, the convolutions of the circular portions lying closely together, side by side, and forming said rim, and a spacing member disposed on said hub and arranged between the ends of the spirals, said spacing member having an internal lubricant chamber which is in communication with the interior of the hub.

6. A resilient wheel, comprising a spirally coiled body and a hub, said hub having a spirally coiled member adapted to receive a shaft and to permit lubricant to pass through its convolutions to the shaft.

7. A resilient wheel comprising a spirally coiled body having ends which are spaced apart, a hub engaged by the ends of the body, and a lubricant receptacle mounted on the hub and arranged between said ends of the body, said lubricant receptacle being open to the hub and said hub having a spirally coiled member adapted to receive a shaft and to permit lubricant to pass between its convolutions to the shaft.

8. A resilient wheel, comprising a spirally coiled body and a flexible hub, the ends of which are engaged by the ends of said body, said hub comprising a plurality of coiled members mounted one within the other, the inner member being formed of soft metal.

9. A resilient wheel, comprising a spirally coiled body and a flexible hub, the ends of which are engaged by the ends of said body, said hub comprising a plurality of coiled members mounted one within the other, one of said members having projections and the other having recesses to receive said projections, to prevent longitudinal relative movement thereof.

10. A resilient wheel, comprising a spirally coiled body, a flexible hub the ends of which are embraced by the ends of said body, and means mounted on said hub between the ends of the body and formed with an internal chamber for lubricant, said chamber being open to the hub.

11. A resilient wheel, comprising a spirally coiled body, a flexible hub the ends of which are embraced by the ends of said body, and a hollow spacing block mounted on said hub between the ends of the body, the interior of said block being adapted to contain lubricant and being open to the hub.

12. A resilient wheel comprising a resilient body, a flexible hub and a spacing member; said resilient body being formed of oppositely disposed spirals which are inclined toward each other and whose ends closely embrace opposite ends of the hub and are spaced apart on the latter, the convolutions of the spirals extending from said hub to the rim of the wheel and thence around in circular form, the convolutions of the circular portions lying closely together, side by side, and forming said rim; said flexible hub being formed of a plurality of coiled members, the inner member of which is of soft metal and is adapted to receive an axle spindle or shaft; and said spacing member comprising a hollow block which is mounted on said hub, between the ends of the body, the interior of said block being adapted to contain lubricant and being open to the hub.

In testimony whereof I have hereunto set my hand in presence of two subscribing witnesses.

WILLIAM F. DOLL.

Witnesses:
C. J. STOCKMAN,
H. C. ROBB.